United States Patent [19]

Wallace

[11] Patent Number: 4,642,493
[45] Date of Patent: Feb. 10, 1987

[54] INTEGRALLY AIR COOLED LINEAR INDUCTION MOTOR

[75] Inventor: Allen K. Wallace, Corvallis, Oreg.

[73] Assignee: Urban Transportation Development Corporation Ltd., Toronto, Canada

[21] Appl. No.: 727,387

[22] Filed: Apr. 25, 1985

[51] Int. Cl.$^4$ ............................................. H02K 41/02
[52] U.S. Cl. ..................................... 310/13; 310/67 R
[58] Field of Search ...................................... 310/12–14, 310/59–63, 55, 57

[56] References Cited

U.S. PATENT DOCUMENTS

| | | | |
|---|---|---|---|
| 2,717,320 | 9/1955 | Shoulders et al. | 310/57 |
| 3,668,444 | 6/1972 | Davey | 310/13 |
| 3,828,211 | 8/1974 | Laronze | 310/13 |
| 3,835,339 | 9/1974 | Laronze | 310/13 |
| 3,906,261 | 9/1975 | Ogura et al. | 310/13 X |
| 4,107,558 | 8/1978 | Brown . | |
| 4,131,812 | 12/1978 | English | 310/13 |

FOREIGN PATENT DOCUMENTS 970820  7/1975  Canada .
 67169  6/1969  German Democratic Rep.
54-37207  3/1979  Japan.

*Primary Examiner*—Donovan F. Duggan
*Attorney, Agent, or Firm*—Spencer & Frank

[57] ABSTRACT

A primary member for a linear induction motor is disclosed comprising a frame having a pair of spaced parallel frame members, a core located between and supported by the frame members, and a motor winding carried by the core. The winding includes a plurality of turns each of which includes a pair of parallel portions supported located in slots in the core and which are interconnected by end windings projecting beyond opposite sides of the core. Each end winding has direction-reversing knuckle portion. Side cover assemblies extend along either side of the core to cover the end winding. Cooling means are provided, a first set of which are located between the frame members and a second set of which are located laterally outboard of and to either side of the frame members.

20 Claims, 12 Drawing Figures

INTEGRALLY AIR COOLED LINEAR INDUCTION MOTOR

The present invention relates to a linear induction motor and in particular to the primary member of such a motor.

The principle of a linear induction motor is well known and it consists basically of a primary member and a secondary member. One of the members is fixed and power is supplied to the primary member to induce an electromotive force upon the secondary member to cause relative movement between the two members. In this way motion can be obtained without the need for torque transmitting devices as used with conventional motors.

It has been proposed to use linear induction motors in a wide variety of applications and some use has been made of such motors. However their wide spread use in the transportation field has been limited although considerable research and development has been conducted on such motors for this particular application. One problem encountered with the use of such motors in the transportation field is the energy dissipated as heat by the motor and the problems associated with the removal of this heat.

The primary member of such a motor usually comprises a core that carries an electrical winding. The winding has a number of coils each of which has a looped end winding projecting laterally from the core. The end windings are closely spaced and also tend to dissipate the greatest proportion of energy in the form of heat. At the same time, because of the rigorous environment in which the motors are intended to operate in the transportation field it is necessary to protect the end winding of the coils. It is therefore found necessary to fit covers that encompass these end winding. This however hinders cooling with the result that exceptionally high temperatures are frequently encountered within the side cover. In order to achieve an acceptable motor life this, in turn, results in the need for a higher grade of electrical insulation on the coils. However, this leads to reduced spacing between the adjacent turns of the coil and a further hindrance to the cooling of the end windings. Thus the reliability of a linear induction motor that is intended for this particular application has been less than acceptable due to the thermally induced failures of the electrical insulation and the motor windings.

It is therefore an object of the present invention to provide a primary member of a linear induction motor in which the above disadvantages are obviated or mitigated.

According therefore to the present invention there is provided a primary member for a linear induction motor comprising an elongate core, a motor winding having a plurality of turns spaced apart along said core and extending transversely thereto, each of said turns having end windings projecting to opposite sides of said core and each including a nose portion to reverse the direction of said winding, a pair of side cover assemblies extending along said core to either side thereof and encompassing said end winding, plurality of fans located on opposite sides of said core and outboard thereof to direct air from one side of a respective cover to the other side and outlet means provided on said other side to permit degrees of air, so as to, cool said end winding, and baffle means located between said end windings and side covers to direct air between the end windings of adjacent turns.

According also to the present invention there is provided a primary member for a linear induction motor comprising a frame having a pair of spaced parallel frame members, a core located between said frame members and supported thereby, a motor winding carried by said core and including a plurality of turns spaced apart along said core and extending transverse thereto, each of said turns including a pair of parallel portions supported by said core, end winding projecting beyond said core on opposite sides thereof and having a direction reversing nose portion, a pair of side cover assemblies extending along said core to either side thereof to cover said end windings and a cooling means to cool said core and winding, said cooling means comprising a first set of cooling elements located between said frame members to extract heat from said core and a second set of cooling elements including a fan, located outboard of said frame members and to either side thereof to direct air through the interior of each said side cover assemblies, so as to, extract heat from said end winding, each side cover assembly including an air inlet and an air outlet on opposed portions thereof such that said fan causes air to flow from said inlet across said winding to said outlet.

By providing the cooling system outboard of the core of the motor it is possible to direct cooling air efficiently over the end windings of the coils and thus ensure that heat is dissipated effectively. The reduction in internal temperature encountered within the side covers reduces the operating criteria for the insulation and permits a less bulky material to be used. This increases the spacing between adjacent coils to enhance the cooling of the coils.

Preferably baffle means are provided between the side cover and the coil end turns to direct the air between the coils rather than around the ends and thereby improve the heat transfer from the coils to the cooling air.

An embodiment to the invention will now be described by way of example only in which.

Figure 1:
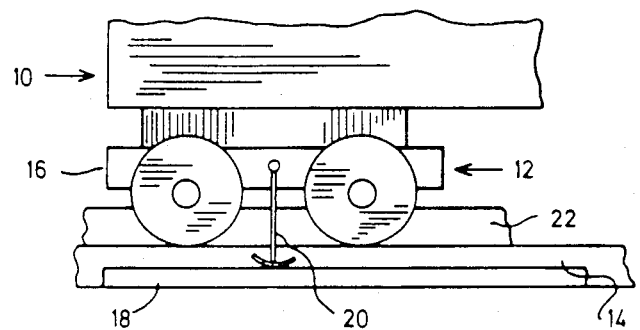
FIG. 1 is a diagrammatic illustration of a linear induction motor installed on a vehicle.

Referring to FIG. 1, a vehicle 10 is supported on a truck 12 that is guided by a rail track 14. The truck 12 carries the primary member 16 of a linear induction motor that receives power from a wayside rail 18 through a pick up 20. A secondary member 22, commonly referred to as a reaction rail, is located between the rails 14 beneath the primary member 16. Upon the application of power to the primary member 16 a thrust is developed between the reaction rail 22 and the primary member 16 to propel the vehicle along the rail 14.

Figure 2:
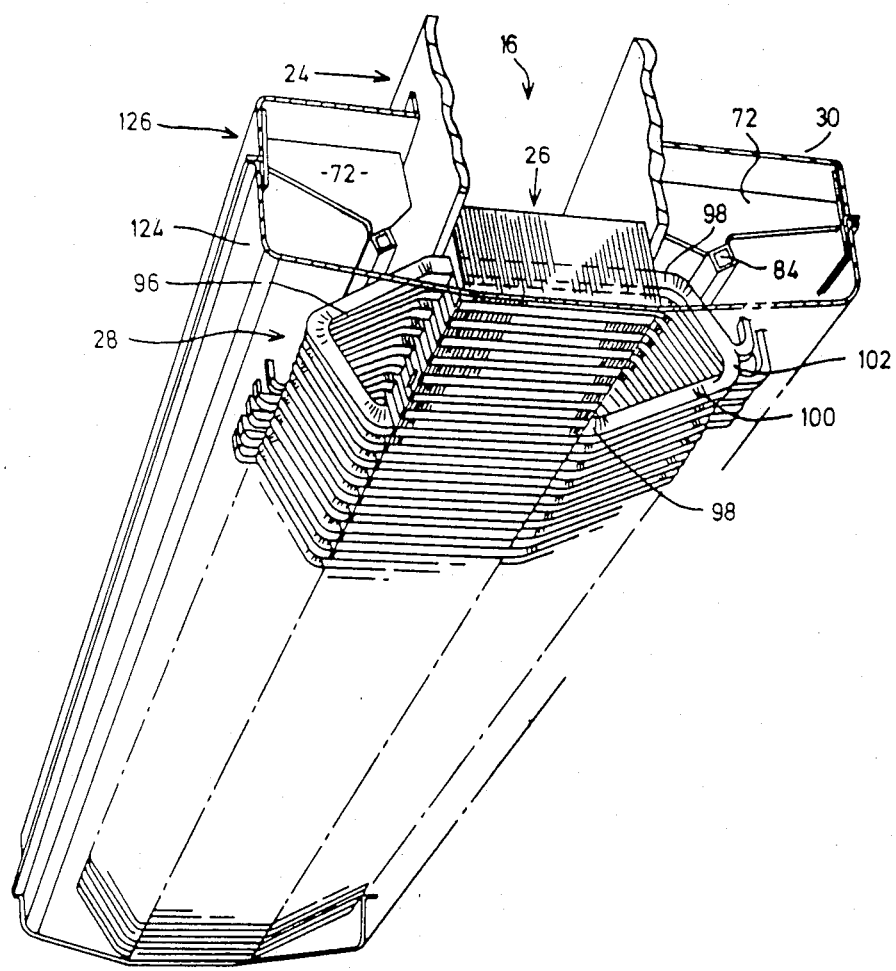
FIG. 2 is a perspective view of the underside of the primary member of the motor shown in FIG. 1 with portions removed for clarity.

The details of the primary member 16 can best be seen in FIG. 2. The primary member 16 comprises a frame 24 that supports a central core 26. A winding 28 is arranged on the core and projects laterally to both sides of the core. A side cover assembly 30 is mounted on the frame 24 and encompasses the portions of the winding projecting laterally from the core 26.

Figure 3:
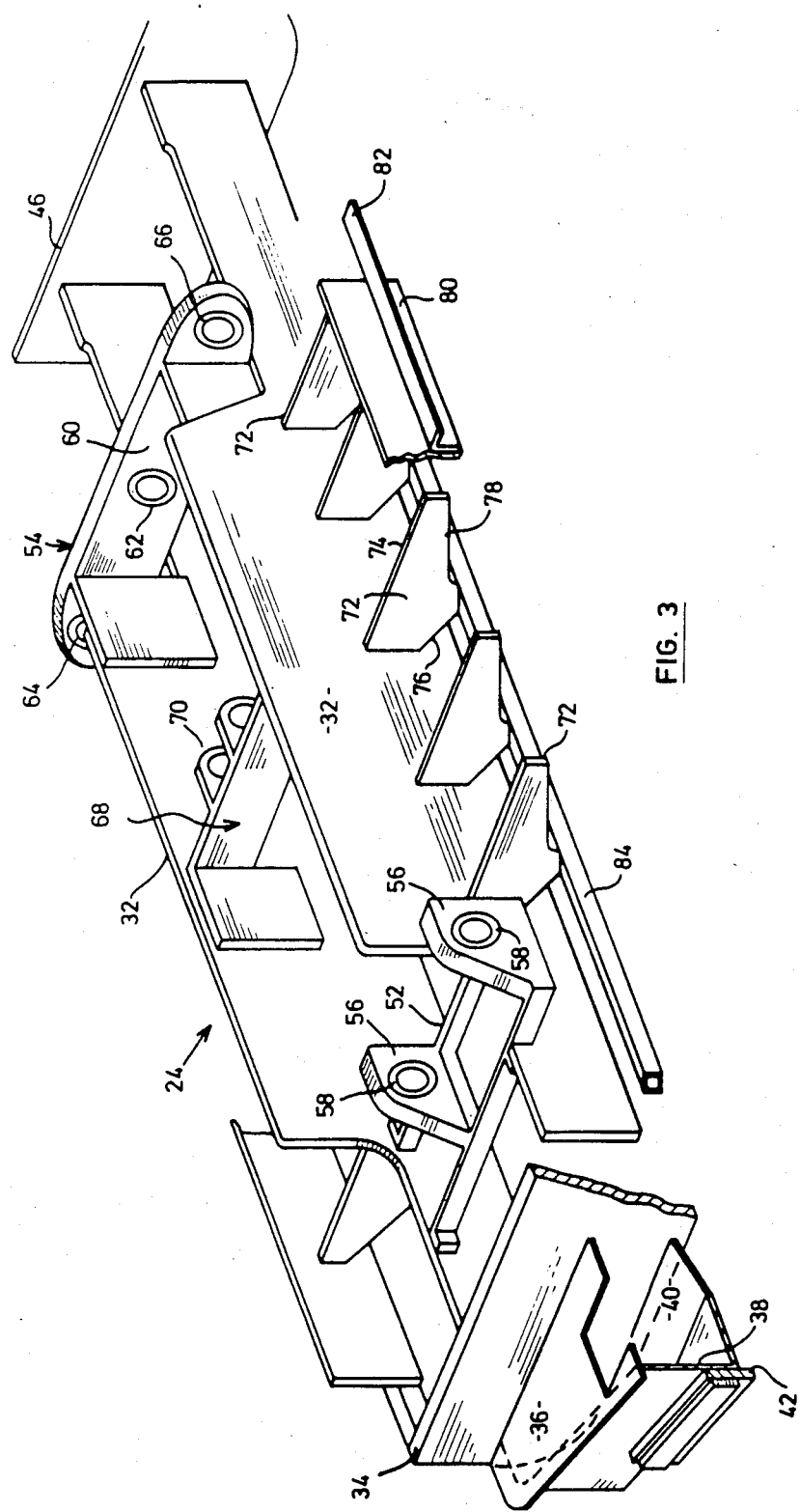
FIG. 3 is a perspective view from above of the frame used in the primary member shown in FIG. 2.
Figure 5:
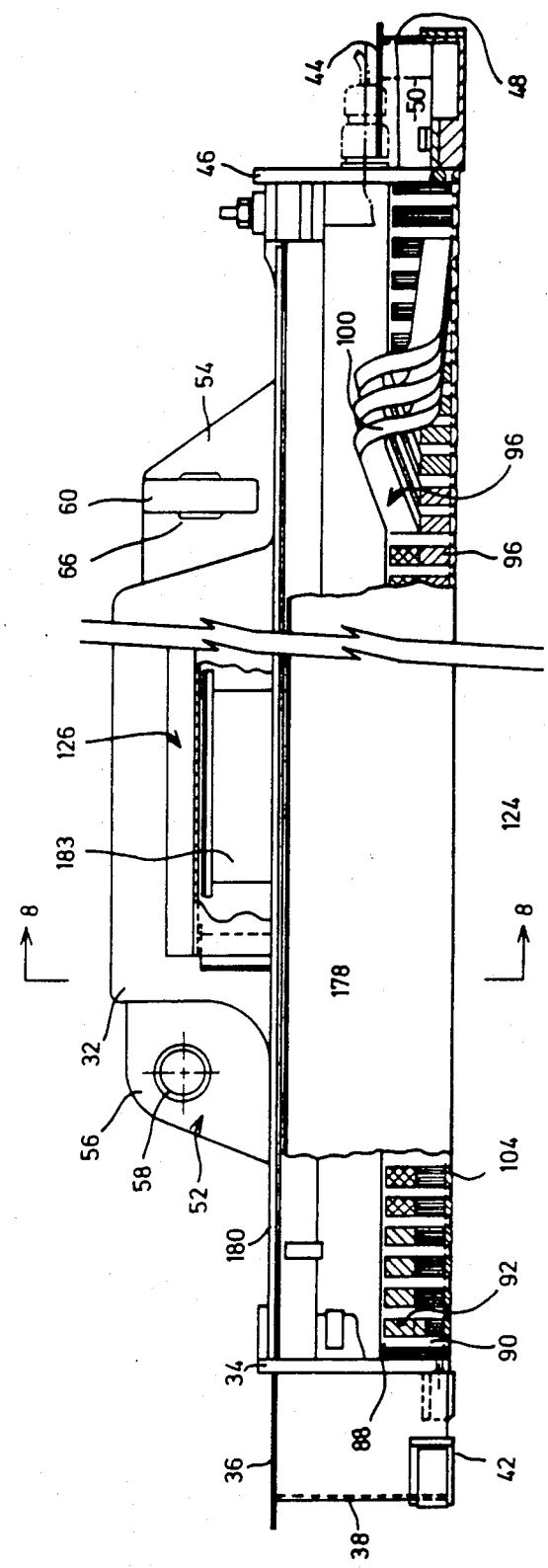
FIG. 5 is a side view of the primary member shown in FIG. 2.

The frame 24 can best be seen in FIGS. 3 and 5. The frame 24 comprises a pair of spaced parallel frame members 32 that extend between outboard and inboard end plates 34, 46 respectively. Each of the end plates 34, 46 extends above and below the frame members 32 and an upper horizontal plate 36 projects from the upper edge of end plate 34. A skirt 38 depends from the horizontal plate 36 to form a housing 40. Located within the housing 40 and secured thereto are a pair of scraper blades 42 that project below the housing 40 to remove debris from the reaction rail 22.

A horizontal plate 44 (FIG. 5) is welded to the inboard end plate 46 and has a skirt 48 depending therefrom. The skirt and end plate define a hollow housing 50 through which electrical cables may be run between opposite sides of the primary member.

A pair of suspension brackets 52, 54 are mounted at opposite ends of the frame members 32 adjacent the inboard and outboard end plates 46, 34 respectively. The suspension brackets 52, 54 are in the form of castings and the bracket 52 has a pair of longitudinally extending webs 56 that each receive a spherical bearing 58. The bracket 54 has a generally transverse web 60 that extends between and projects to either side of the frame members 32. A spherical bearing 62 is received in the web 60 between the frame members 32 and similar bearings 64, 66 are received in the web 60 on either side of the frame members. The bearings 58, 62, 64 and 66 provide suspension points to connect the frame and thereby the primary member to the underside of the truck 12.

Thrust from the primary member to the vehicle is transmitted through a bracket 68 that is located between the frame members 32. The bracket 68 has an upstanding clevis 70 that is connected to a suitable point on the truck to transmit thrust between the truck and the motor.

Projecting laterally from the frame members 32 are a plurality of outriggers 72 each of which has a generally triangular shape with a horizontal upper surface 74 and a pair of downwardly inclined lower surfaces 76, 78 respectively. A stringer 80 is welded to the terminal portion of each of the outriggers 74 to extend generally parallel to the frame members 32 between the outriggers. An angle member 82 is also welded to the stringer 80 on the side opposite to the frame member 32 and extends beyond either end of the stringer to the end plates 34,46. The angle member 82 serves as an abutment for the side cover assembly 30.

An elongate tubular support member 84 is welded to the outriggers 72 at the junction between the lower surfaces 76, 78 to extend generally parallel to the frame members 32 between the end plates 34, 46. The support member 84 provides a support for the lateral portions of the windings that extend beyond the core 26.

As shown in FIGS. 2, and 5 through 9, the core 26 is laminated from a plurality of thin vertical plates 88 that extend generally parallel to the frame members 32. The plates 88 are formed from magnetic steel having an insulating coating on each exterior surface. The plates 88 are located between the frame members 32 and are secured to one another and to the frame members by tie bolts 89. Each of the plates 88 projects below the lower edge of the frame members 32 and has teeth 90 depending therefrom to define a plurality of transverse slots 92. The teeth 90 are undercut on their vertical edges adjacent the lower ends thereof to provide a dovetail groove 94.

Figure 6:
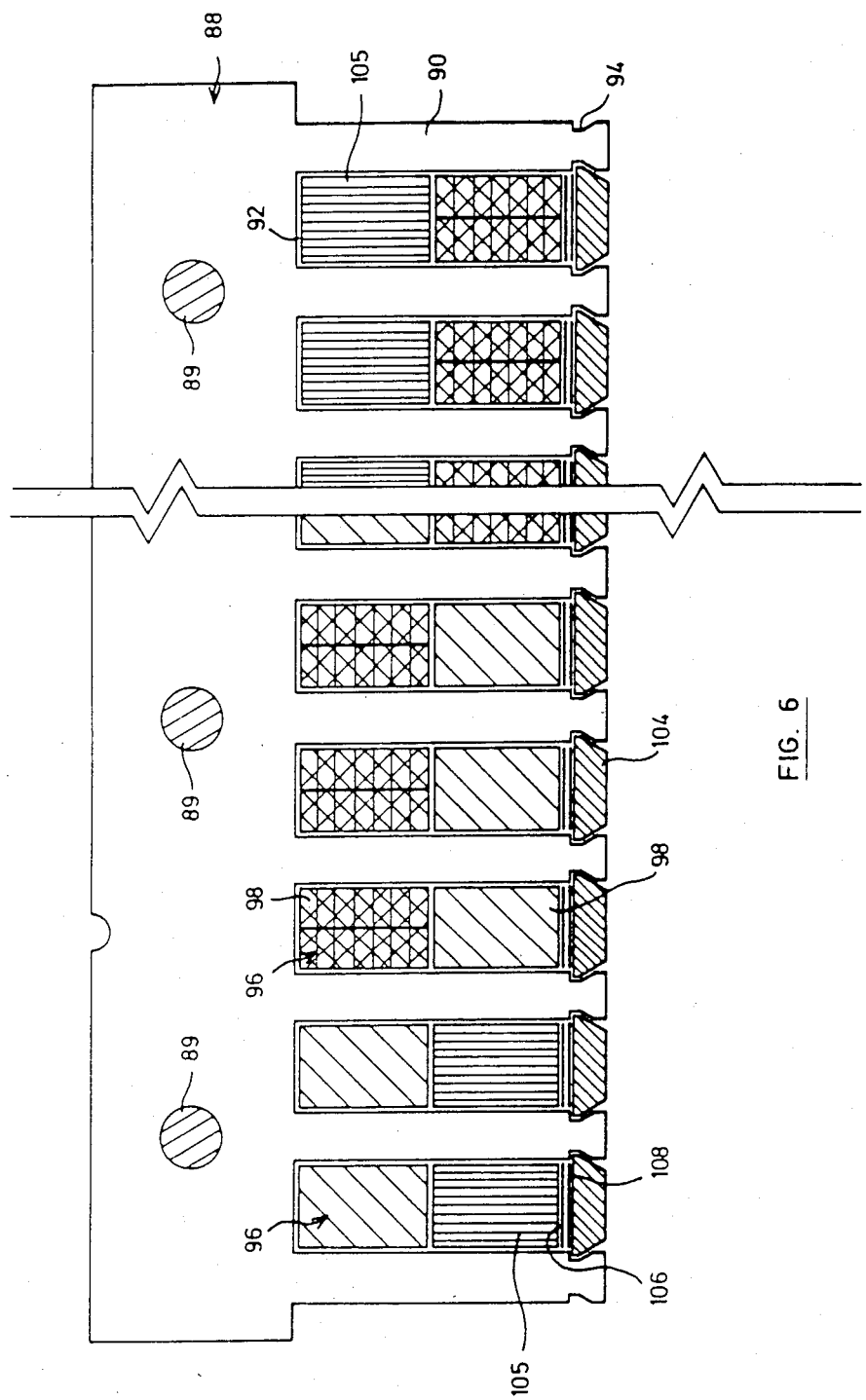
FIG. 6 is an enlarged view of a portion of the core shown in the side view of FIG. 5.

Each of the slots 92 receives a portion of the winding 28. The winding consists of a number of coils 96 which have a pair of generally parallel portions 98 interconnected by an end winding 100. The end winding 100 is bent as indicated at 102 (FIGS. 2 and 8) to provide a knuckle that reverses the direction of the coil. The parallel portions 98 are spaced apart along the longitudinal axis and are received in corresponding slots 92. The plane of the coils 96 is inclined to the horizontal and, except at the extrem ends of the core 26, each of the slots 92 will receive the parallel portions 98 of two coils 96 stacked one above the other. As best seen in FIG. 6, to retain the parallel portions 98 in the slot 92, a wedge member 104 is provided which cooperates with the dovetail grooves 94 to prevent vertical movement within the slot. At the extreme ends of the core 26 where only one coil is received in the slots 92, a filler block is utilised to retain the coils within the slot.

A pair of liners 106, 108 are provided between the wedge and the lower surface of the coil to provide protection for the insulation on each of the coils. One of the liners 106 is formed from a material sold under the trade name NOMEX and the other liner 108 is made from a material sold under the trade name GLASTIC.

Figure 7:
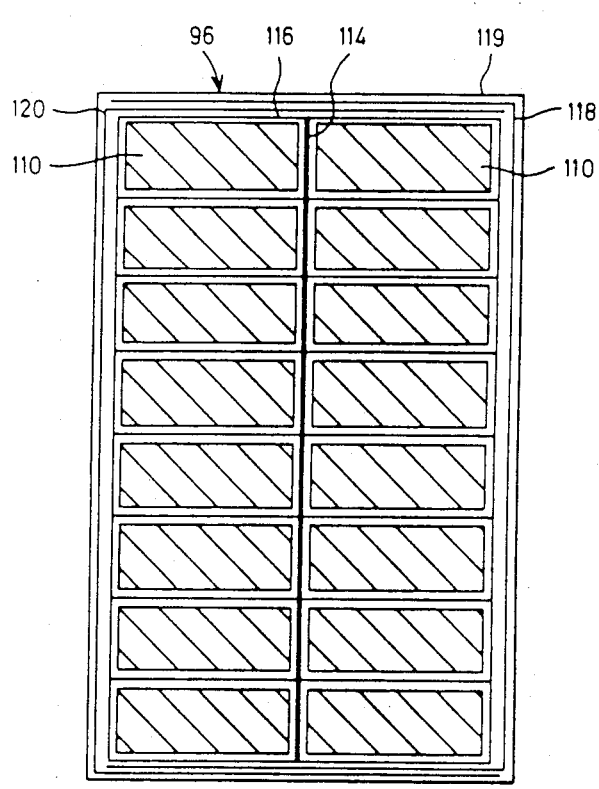
FIG. 7 is a section of one of the windings shown in FIG. 6 on an enlarged scale.

The formation of each of the coils is best seen in FIG. 7. Each coil 96 consists of a plurality of turns of a conductor 110 with successive turns insulated from one another. The conductor 110 is of generally rectangular cross-section and the successive turns are stacked relative to one another to form a generally rectangular cross-section for the conductor. Each of the turns is wrapped in a layer of 5 ml dacron tape 116. The turns 110 are stacked in two arrays side by side and separated by a spine 114 made from NOMEX of a thickness of 20 mill. A pair of channel members 118, 120 formed from 10 mill NOMEX material are placed from opposite directions over the stacked turns 110 to provide two additional layers of insulation top and bottom and the whole assembly then wrapped in 7 mill polyglass tape with a 50% overlap between successive passes of the tape. In this way electrical insulation between adjacent turns and between adjacent coils is provided in a compact manner.

Figure 8:
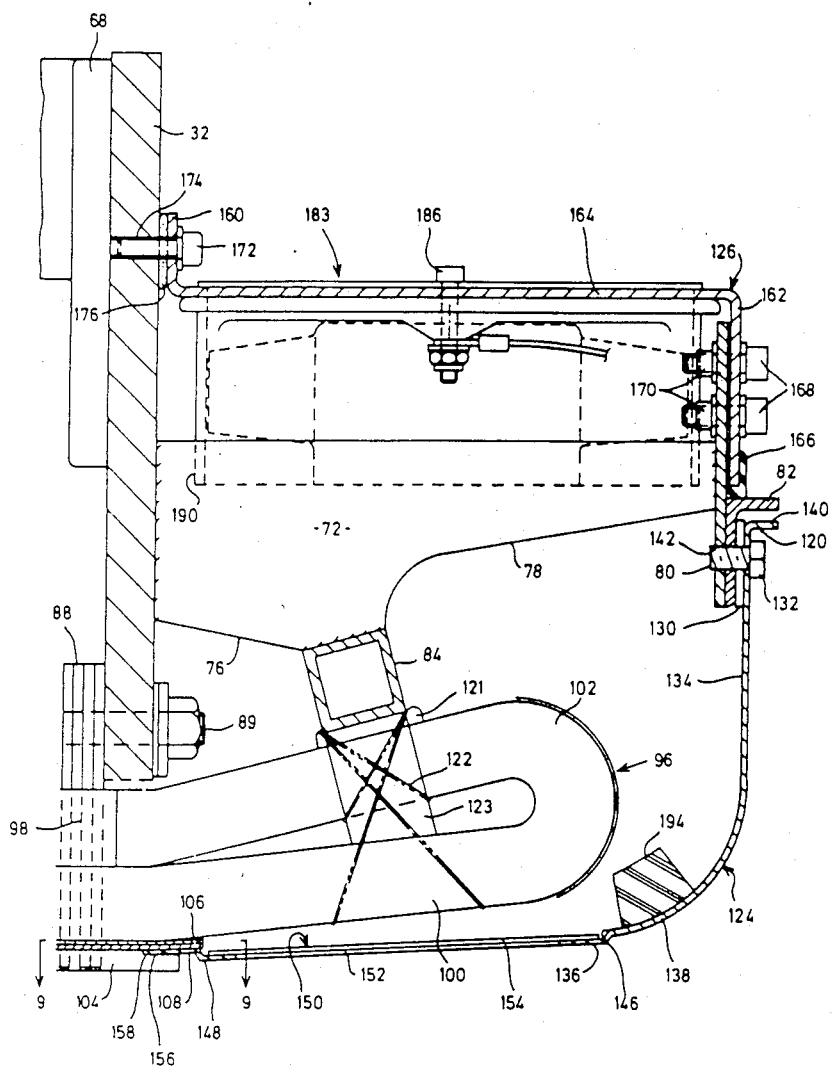
FIG. 8 is a section on the line 8—8 of FIG. 5.
Figure 9:
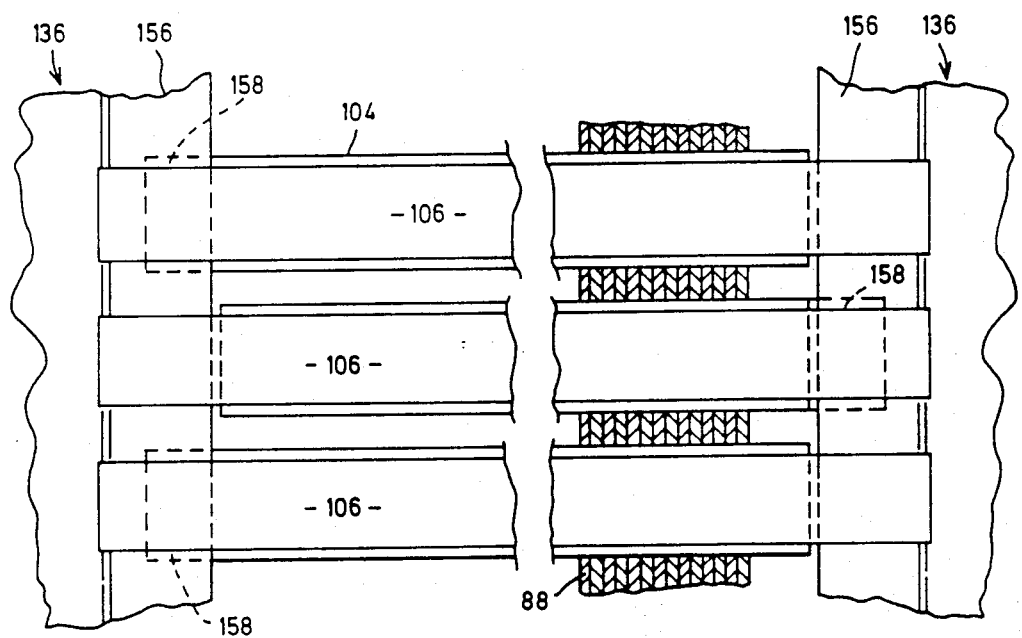
FIG. 9 is a section on the line 9—9 of FIG. 8.
Figure 10:
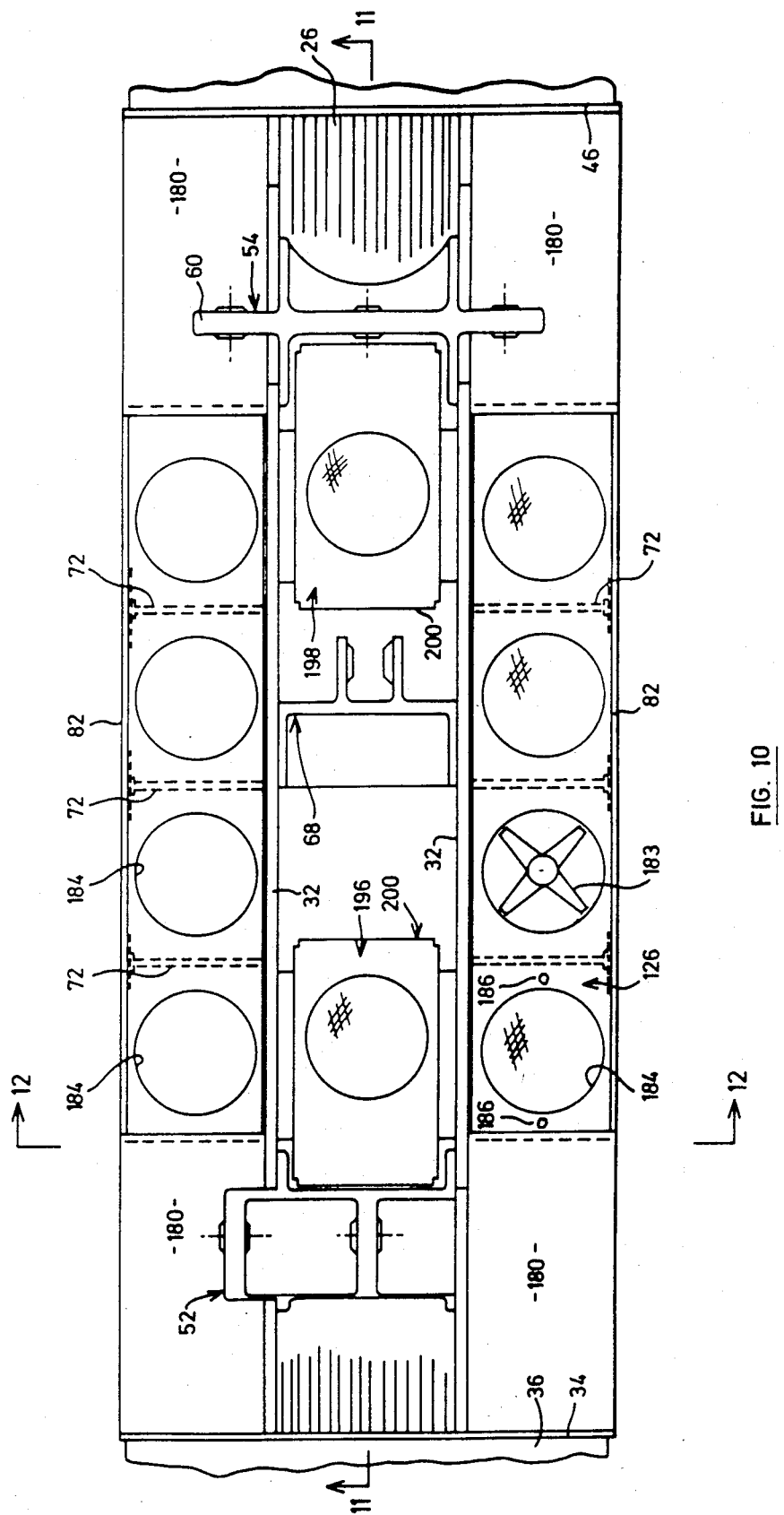
FIG. 10 is a plan view of the primary member shown in FIG. 2.
Figure 11:
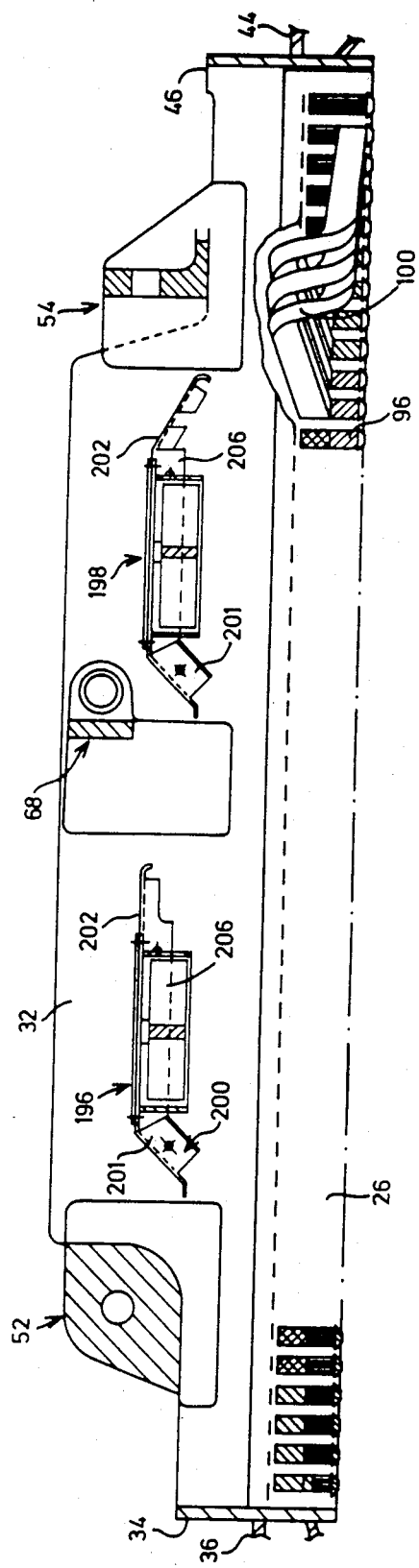
FIG. 11 is a section on the line 11—11 of FIG. 10.
Figure 12:
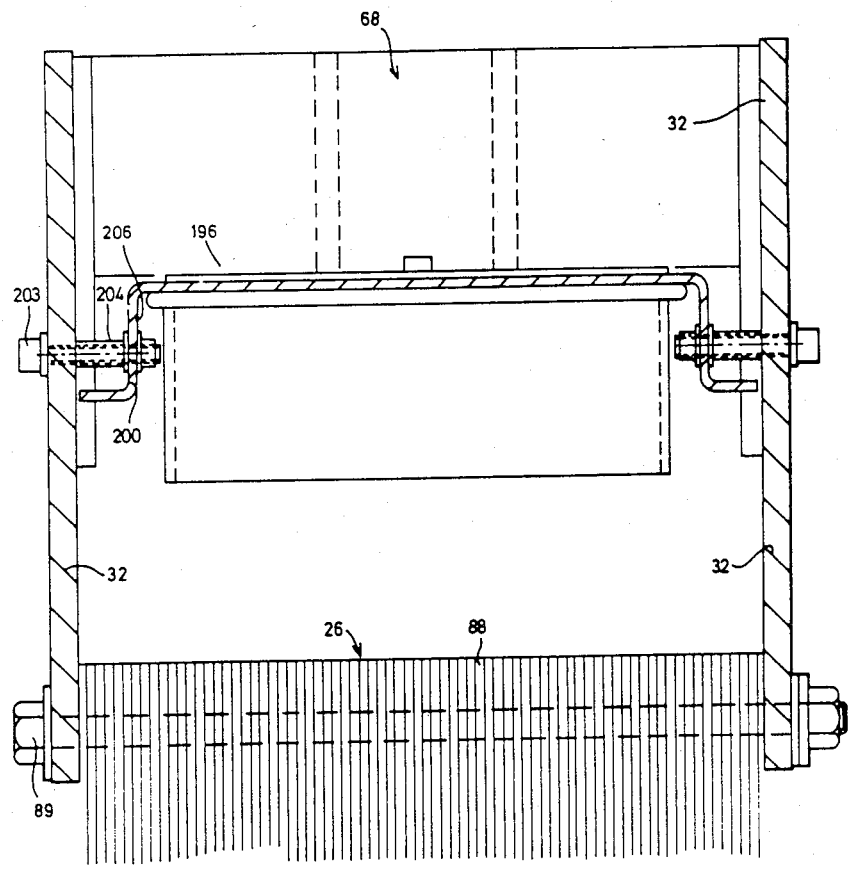
FIG. 12 is a section on the line 12—12 of FIG. 10.

With the coils 96 installed within the slots 92, the end winding 100 project laterally beyond the frame members 32. As can be seen in FIG. 8, the end winding 100 are supported by the support member 84 that is provided with a projecting flange 120 on its underside. The end winding 100 is attached to the support member 84 by wire 122 that is wrapped around the support member 84, a Dacron pad 121 and around the coil end winding 100. Dacron spacers 123 are provided at this point between the end winding of the coils to negate vibration at the ties and consequent loosening of the support and/or wear of the insulation.

Figure 4:
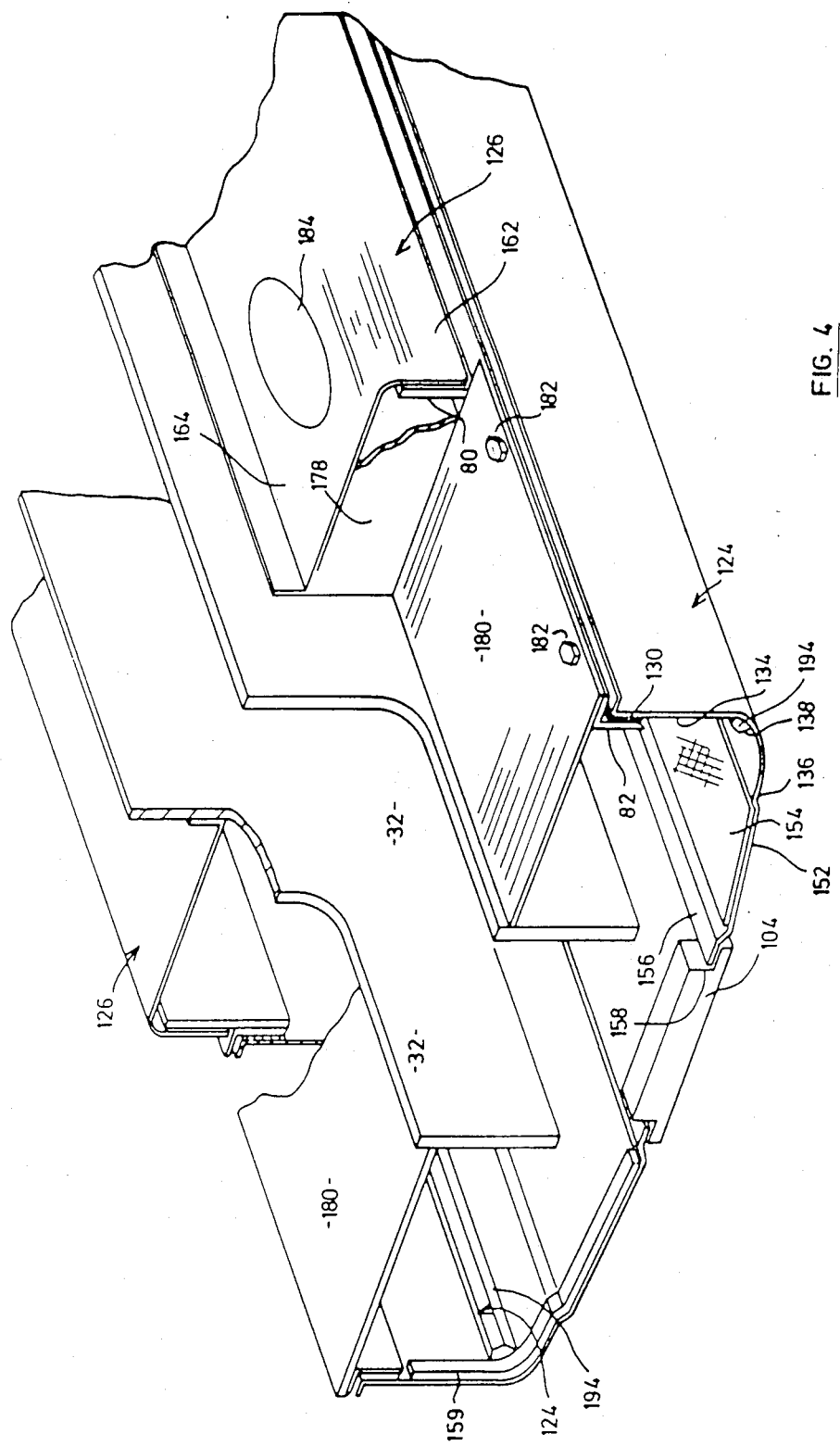
FIG. 4 is a perspective view showing a portion of the frame shown in FIG. 3 with covers fitted.

In order to protect the laterally extending end winding 100 of the coils 96 the side cover assembly 30 is fitted along the length of the primary member to encompass the end winding 100 and is best seen in FIGS. 4 and 8. Each of the side cover assemblies 30 comprises a lower cover 124 and an upper cover 126. The lower cover 124 is supported at one end by the angle member 82 and at the opposite end by the alternate ones of the wedges 104. The upper edge 128 of the lower member 124 is bent outwardly to provide a stiffening rib and a gasket 130 inserted between the angle member 82 and the lower cover 124. Bolts 132 pass through the lower cover 124 and are threaded into the stringer 80 to secure the lower cover.

The lower cover 124 has a vertical portion 134 and a horizontal portion 136 that are interconnected by an arcuate portion 138. The upper edge 128 of the vertical portion 134 is bent outwardly to provide a stiffening rib portion 140 and bolts 132 pass through the upper edge 128 and into threaded holes 142 in the stringer 80 to secure the upper edge 128 of the lower cover 124. The horizontal portion 136 of the lower cover 124 is jogged at opposite marginal edges as indicated by reference numerals 146 and 148. Portions of the depressed portion 150 between the jogs 146, 148 are removed to provide an aperture 152. A mesh 154 is located within the depression 150 and covers the aperture 152 to prevent the ingress of extraneous material.

The inner edge 156 of the horizontal portion 136 is secured in a notch 158 formed on the upper surface of the wedges 104. The inner edge 156 fits between the liner 108 and the wedge 104 and is securely held without physically contacting the undersurface of the coil 96 and a sealing strip 159 (FIG. 4) is located on the interior of the lower side covers at opposite ends to seal against the lower surface of end plates 34, and 36. As can best be seen in FIG. 9, the wedges 104 are provided with the notches 158 at one end only. The wedges are staggered along the primary member with the notches 158 on adjacent wedges projecting to opposite sides of the core 26. In this way support is provided for opposite sides of the core 26 for each of the lower side covers 124.

The upper side cover 126 has a pair of inboard and outboard vertical flanges 160, 162 respectively interconnected by a horizontal portion 164. A gasket 166 is carried by the lower edge of the outboard vertical flange 162 and rests against the upper surface of the angle member 82. Bolts 168 pass through the outboard flange 162 and are secured to weld nuts 170 attached to the interior of the stringer 80.

The inboard vertical flange 160 is secured to the frame member 32 by bolts 172 that are received in threaded bores 174 in the frame member 32. A gasket 176 is located between the frame member 32 and the inboard flange 160 to seal the upper side cover 126. The upper side cover 126 does not extend the full length of the frame members 32 but terminates prior to the suspension brackets 52, 54. End plates 178 (FIG. 4) seal the ends of the side cover and are supported on respective ones of the outriggers 72. The balance of the coils are covered by deck plates 180 that are simply planar sheets secured by set screws 182 to the outrigger and end plate 44.

To provide cooling for the turns located within the side cover assembly 30, the cooling arrangement shown in FIGS. 8 and 10-12 is used. Fans 183 are mounted on the horizontal portion 164 of the upper side cover 126 between the outriggers 72. Each of the fans is located beneath an aperture 184 in the horizontal portion and is secured to the horizontal portion by bolts 186. The apertures 184 are covered by expanded metal mesh 188 to prevent the ingress of extraneous material. The fans 183 are commercially available units available from Rotron and incorporate a thermal protection device to prevent overheating of the fan motor if the fan is stalled by, for example, the ingress of snow. The fans 183 draw air through the apertures 184 and blow it across the end winding 100 of the coils 96. Air is then expelled through the apertures 152 in the lower cover 124. A baffle in the form of an air dam 194 (FIG. 8) is located on the arcuate portion 138 to direct air between the adjacent end winding 100 rather than around the outside of the end winding 100. The air dam is formed from a synthetic rubber strip and runs the entire length of the lower cover 124. It is spaced from the end coil sufficiently to avoid contact with end coil during operation, but sufficiently close to ensure that air flow between the end coil and the air dam is restricted. Typically a spacing of 3 m.m. has proved satisfactory.

To provide cooling for the core 26 a pair of fan assemblies 196, 198 are located between the frame members 32 above the core 26. Each of the fan assemblies 196 has a sheet metal bracket 200 to secure it to the frame members and to direct air along the upper surface of the core. Bolts 203 extend through the frame members 32 and pass through spacers 204 and into apertures in a downwardly projecting flange 206 of the bracket 200. Each bracket 200 has front and rear extensions 201, 202 respectively that extend between the brackets 52-68 and 68-54 to provide a substantially continuous baffle above the core 26. This acts to direct air along the core between the frame members 32.

During operation of the primary member electrical energy flowing to the coils produces a thrust between the primary and secondary members. The heating effect of the energy in the coils causes the temperature within the side cover assemblies 30 to increase. To avoid excessive temperatures being encountered the fans 183 provide air through the side cover assembly 30 which is directed by the baffle 194 between adjacent coils of the winding 28. This effectively maintains the temperature within the side cover at reasonable limits. The second set of cooling elements provided by the fans 196 and 198 are effective to extract heat from the core although the heat generated in this zone tends to be less than that generated in the end winding of the coils.

Air flow between the coils is facilitated by the insulation system shown in FIG. 6 which provides a compact yet effective insulation to maximize the free space between the coils and increase the air flow therethrough. The side cover assemblies 30 can be readily removed for maintenance and the plurality of fans used at each side of the motor ensures continued cooling in the event that one fan fails.

I claim:

1. A primary member for a linear induction motor comprising an elongate core,
  a motor winding having a plurality of turns spaced apart along said core and extending transversely thereto, said turns each having end windings projecting to opposite sides of said core and each including a knuckle portion to reverse the direction of said winding,
  a pair of side cover assemblies extending along said core to either side thereof and encompassing said end winding, a plurality of fans located on opposite sides of said core and outboard thereof to direct air from one side of a respective side cover assembly to the other side and outlet means provided on said other side to permit egress of air so as to cool said end winding, and baffle means located between said end windings and said side cover assemblies to direct air between the end windings of adjacent turns.

2. A primary member according to claim 1 wherein each of said outlet means is located opposite said fans.

3. A primary member according to claim 1 wherein said core is positioned between a pair of frame members and each said side cover assemblies is supported on a respective outrigger assembly extending transversely from said frame members.

4. A primary member according to claim 3 wherein said fans are supported by said outrigger assemblies.

5. A primary member according to claim 4 wherein each of said side cover assemblies includes first and second elements, each of said elements having one edge terminating adjacent to said core and an opposite edge supported by said outrigger assembly.

6. A primary member according to claim 5 wherein said fans are mounted on said first element.

7. A primary member to claim 6 wherein outlet apertures are provided on said second elements to permit egress of air from said side covers.

8. A primary member according to claim 7 wherein said outlet apertures are opposite said fans.

9. A primary member according to claim 8 wherein said outrigger assembly includes a stringer extending generally parallel to said frame members and spaced therefrom and said opposite edges are connected to said stringer.

10. A primary member according to claim 9 wherein said baffle means is attached to the interior of said second element and extends generally parallel to said frame member.

11. A primary member according to claim 9 wherein said stringer is connected to said frame member by transverse beams and a support member extends between said beams generally parallel to said frame members, said end winding of said turns being connected to said support member intermediate the ends thereof.

12. A primary member according to claim 1 wherein further fans are located adjacent said core to direct air over said core.

13. A primary member according to claim 12 wherein said core is supported between a pair of frame members and said further fans are located between said frame members.

14. A primary member for a linear induction motor comprising a frame having a pair of spaced parallel frame members, a core located between said frame members and supported thereby, a motor winding carried by said core and including a plurality of turns spaced apart along said core and extending transverse thereto, each of said turns including a pair of parallel portions supported by said core and interconnected by end windings projecting beyond said core on opposite sides thereof and having a direction reversing knuckle portion, a pair of side cover assemblies extending along said core to either side thereof to cover said end winding and cooling means to cool said core and winding, said cooling means comprising a first set of cooling elements located between said frame members to extract heat from said core and a second set of cooling elements including a fan located outboard of said frame members and to either side thereof to direct air through the interior of each of said side cover assemblies, so as to extract heat from said end winding,each side cover assembly including an air inlet and an air outlet on opposed portions thereof such that said fan causes air to flow from said inlet across said end winding to said outlet.

15. A primary member according to claim 14 wherein baffle means are located within each of said side covers assemblies to direct air across said end winding.

16. A primary member according to claim 14 wherein a plurality of fans are located on each side of said core.

17. A primary member according to claim 16 wherein said fans are mounted on a first part of said side cover assembly and said outlet is mounted on a second part of said side cover, an outrigger assembly being provided on said frame members to interconnect said first and second parts outboard of said end winding.

18. A primary member for a single sided linear induction motor comprising an elongate core member having a lower surface with a plurality of transverse slots formed therein, a motor winding having a plurality of turns each having a pair of spaced parallel portions received in respective ones of said slots and interconnected by an end winding extending laterally to opposite sides of said core, side covers including an upper part and a lower part and located at either side of said core and at least partially encompassing said end winding, and cooling means located adjacent said side covers and outboard of said core to extract heat from said end winding, said cooling means including a plurality of fans associated with each side cover and directing air through said side cover.

19. A primary member according to claim 18 wherein a plurality of apertures is provided on said lower part of each side cover to facilitate egress of air.

20. A primary member according to claim 19 wherein a baffle is provided on said lower part to direct air between adjacent turns of said winding in passing from said fan to said apertures.

* * * * *